United States Patent
Kishinevski et al.

(10) Patent No.: US 10,297,437 B2
(45) Date of Patent: May 21, 2019

(54) SULFUR PLASMA LAMP

(71) Applicant: ANATOLY GLASS, LLC, North Hatfield, MA (US)

(72) Inventors: Anatoly Kishinevski, Holyoke, MA (US); Justin Herzig, North Hatfield, MA (US)

(73) Assignee: ANATOLY GLASS, LLC, North Hatfield, MA (US)

( * ) Notice: Subject to any disclaimer, the term of this patent is extended or adjusted under 35 U.S.C. 154(b) by 0 days.

(21) Appl. No.: 15/902,278

(22) Filed: Feb. 22, 2018

(65) Prior Publication Data

US 2018/0247806 A1    Aug. 30, 2018

Related U.S. Application Data

(60) Provisional application No. 62/463,702, filed on Feb. 26, 2017.

(51) Int. Cl.
| | |
|---|---|
| *H01J 61/04* | (2006.01) |
| *H01J 61/36* | (2006.01) |
| *H01J 61/073* | (2006.01) |
| *A01G 9/20* | (2006.01) |
| *H01J 61/12* | (2006.01) |
| *A01G 22/05* | (2018.01) |

(52) U.S. Cl.
CPC .............. *H01J 61/361* (2013.01); *A01G 9/20* (2013.01); *H01J 61/0735* (2013.01); *H01J 61/12* (2013.01); *A01G 22/05* (2018.02)

(58) Field of Classification Search
USPC ........................................................ 313/623
See application file for complete search history.

(56) References Cited

U.S. PATENT DOCUMENTS

| | | | |
|---|---|---|---|
| 3,611,015 A | * | 10/1971 | Kim .................... H01J 61/92 313/581 |
| 3,633,061 A | | 1/1972 | Paquette |
| 3,748,520 A | | 7/1973 | Silver |
| 3,753,019 A | | 8/1973 | Hellman |

(Continued)

FOREIGN PATENT DOCUMENTS

DE      102011012829 A1    12/2011

OTHER PUBLICATIONS

Crawford et al.,"An In-Situ Photometric and Energy Analysis of a Sulfur Lamp Lighting System", Lighting Research Group, pp. 1-5 (Jun. 1995).

(Continued)

*Primary Examiner* — Christopher M Raabe
(74) *Attorney, Agent, or Firm* — Browdy and Neimark, P.L.L.C.

(57) ABSTRACT

A sulfur plasma lamp has a lamp envelope of transparent or translucent glass or ceramic material. At least two silicon carbide electrodes are hermetically sealed with the lamp envelope and in contact with an interior of the lamp envelope. A quantity of sulfur within the interior of the lamp envelope is sufficient to create a sulfur plasma upon excitation. A buffer gas within the interior of the lamp envelope enables initial discharge and heating of the interior of the lamp envelope to excite the sulfur into a plasma state. More than two electrodes may be provided, and an electrical potential is created between different pairs of the electrodes at different times, thereby inducing stirring of the plasma upon excitation of the material into a plasma state.

19 Claims, 9 Drawing Sheets

(56) References Cited

U.S. PATENT DOCUMENTS

| | | | |
|---|---|---|---|
| 3,829,729 A | | 8/1974 | Westlund et al. |
| 4,189,826 A | | 2/1980 | Smith |
| 4,540,373 A | * | 9/1985 | Rothwell ................. H01J 9/326 |
| | | | 313/634 |
| 4,912,364 A | * | 3/1990 | Hollo .................... H01J 61/12 |
| | | | 313/306 |
| 5,757,130 A | | 5/1998 | Dolan et al. |
| 5,825,132 A | | 10/1998 | Gabor |
| 5,831,386 A | | 11/1998 | Turner et al. |
| 5,834,895 A | | 11/1998 | Dolan et al. |
| 5,866,980 A | | 2/1999 | Dolan et al. |
| 5,925,981 A | | 7/1999 | Turner et al. |
| 6,624,577 B2 | | 9/2003 | Meszaros et al. |
| 6,696,788 B2 | | 2/2004 | Lapatovich et al. |
| 7,541,729 B2 | | 6/2009 | Park |
| 2002/0140381 A1 | | 10/2002 | Golkowski et al. |
| 2008/0067939 A1 | * | 3/2008 | Selverian ................. H01J 9/28 |
| | | | 313/636 |

OTHER PUBLICATIONS

Krizek et al., "Uniformity of Photosynthetic Photon Flux and Growth of 'Poinsett' Cucumber Plants Under Metal Halide and Microwave-Powered Sulfur Lamps", Biotronics, pp. 81-92, vol. 27 (Sep. 1998).

Kozlov et al., "Electrodeless Microwave Discharges as Sources of Light and UV-Emission for the Illumination and Biomedical Applications", Proceedings of IV International Workshop Microwave Discharges: Fundamentals and Applications, pp. 1-10 (Sep. 2000).

Tech Brief, "Sulfur Lamp With $CaBr_2$ Additive for Enhanced Plant Growth", John F. Kennedy Space Center, Florida, pp. 1-5 (Jul. 2000).

Johnston, "Transport and equilibrium in molecular plasmas: the sulfur lamp", Technische Universiteit Eindhoven, pp. 1-158 (2003).

LG, Your New Lightning with PLS plasma lightning system; LPS light pipe system, pp. 1-40.

Wikipedia entry, Mercury—Vapor Lamp, Jul. 7, 2017, pp. 1-6.

\* cited by examiner

SULFUR PLASMA LAMP

CROSS-REFERENCE TO RELATED APPLICATION

This patent application claims the benefit of U.S. Provisional Application 62/463,702, filed Feb. 26, 2017, the entire disclosure of which is hereby incorporated herein by reference.

TECHNICAL FIELD

The present invention relates to plasma lamps and their manufacture and use, and more specifically to sulfur plasma lamps with non-oxide ceramic electrodes such as silicon carbide electrodes.

BACKGROUND

High-efficiency light sources that offer a balanced and complete emission spectrum (white light) are used in the consumer, agricultural, and industrial market place. There are certain options available to these markets that meet the criteria of the light source being very efficient and offering a full spectrum light. Typical white light sources include high-pressure mercury lamps; metal halide lamps, high pressure xenon plasma lamps, or less frequently, sulfur plasma lamps. Xenon lamps are non-toxic but may emit ultraviolet light as well as visible light, and include xenon incandescent lamps used for automobile headlights, which do not emit ultraviolet light because the glass is engineered to filter out the ultraviolet, as well as xenon discharge lamps that can be expensive and that operate at very high pressures and can be dangerous if breached. In halide-containing lamps, the tungsten electrode material may tend to vaporize during operation of the lamp, but a recycling process known as the halogen cycle occurs in which the small amount of vaporized tungsten re condenses on the filament, prolonging life of the lamp.

Sulfur plasma lamps emit almost no ultraviolet light, which might otherwise waste energy, age plastic, or damage biological tissue, as can happen with mercury, tungsten filament lamps, or xenon lamps. Sulfur plasma lamps systems tend to be more complex and bulkier than, for example, metal halide lamps having just a small envelope with electrodes. Unlike metal halide lamps, in which bromides, chlorides, and mercury in the lamp emit a combination of atomic photoemission, sulfur plasma lamps produce molecular photoemission due to the presence of dimers and/or more complex sulfur molecules (S3, S8, etc.). Because plasma is very high energy the molecular state is dynamic and continuously changing and the molecular emission is over a broad spectrum, in contrast to the distinct spectral lines of atomic emission, thereby providing greater spectral uniformity over the 400-700 nanometer range of white light. The continuous sulfur plasma emission spectrum output nearly matches sunlight perfectly. Sulfur is benign and inexpensive with little environmental impact, and sulfur plasma lamps need not incorporate hazardous mercury as is used in other technologies. Sulfur plasma lamps are especially useful for providing light to plants. Plants, such as bananas, grown in indoor greenhouses with sulfur plasma lamps can yield more vegetation and fruit than plants grown with other traditional kinds of white light sources. Sulfur plasma lamps can be operated at high power levels and thereby illuminate very large spaces.

Sulfur plasma lamps currently available typically have no electrodes and are shielded and mounted in a microwave or EMF resonance cavity. One reliable method that has been found is to excite a sulfur plasma by using a microwave waveguide and resonance cavity system. A mesh is used in conjunction with the resonance cavity, similar to a microwave oven. The resonance cavity must be carefully tuned, and a magnetron is necessary for this method, but this method can provide a powerful lamp with a long lifetime, although there is a minimum power that is dependent on the type of magnetron that is available. Alternatively, microwave sources that are solid-state chips may be used instead of magnetrons in connection with sulfur or mercury plasma lamps. Another method uses a radio-frequency coil in near proximity to or around the perimeter of a hermetically sealed envelope containing sulfur and a buffer gas, as is done in connection with the Icetron induction light system. The use of a radio-frequency coil in near proximity to the sulfur induces excitation of the sulfur by way of electromagnetic induction. This technique involve complex technology that can be costly, and efficiency is limited due to the limits of coupling efficiency between the induction source and the contents of the lamp. Sulfur plasma lamps can be driven with electrodes if the lamp is spun at high speed to create centrifugal force that keeps sulfur away from the electrodes to prevent chemical reaction between the electrodes and sulfur. An attempt has been made to use metal electrodes coated with metal oxides for driving sulfur plasma lamps, with the intention that the metal oxide coating will prevent chemical reaction between the metal and the sulfur, but smooth and consistent operation of the lamp and the overall lifetime of the lamp is dependent on the oxide layer not being breached due to cyclical heating, aging, pinholing by passage of electricity in a small concentrated location, cracking due to thermal expansion mismatch between the oxide layer and metal, etc., and reliable and consistent discharge depends on the degree of predictability of electric current passing through the oxide layer.

SUMMARY

The invention provides a sulfur plasma lamp in which the plasma is driven directly with electrodes as is accomplished with standard light bulbs such as metal halide and mercury lamps. According to the invention, it has been discovered that if silicon carbide is used as the electrode material, the sulfur plasma can be driven reliably by the electrodes, especially if the silicon carbide electrodes are doped to increase electrical conductivity, and yet there will be no substantial chemical reactivity between the silicon carbide and the sulfur, which is otherwise very chemically reactive, especially in the plasma state. Doping of the silicon carbide can make it conduct electricity just as well as metal. The silicon carbide exhibits long lifetimes and good performance and the ability to directly excite the sulfur to a plasma state. Because the sulfur plasma lamp is driven by electrodes, it is possible to operate the lamp over a substantial range of intensities. Sulfur plasma lamps according to the invention involve simple technology that can be scaled small, with ease of manufacture, and the lamps can be used in a wide range of applications due to the wide range of power intensities possible due to the nature of the technology.

According to one aspect of the invention, a sulfur plasma lamp includes a lamp envelope of transparent or translucent glass or ceramic material, and at least two non-oxide ceramic electrodes hermetically sealed with the lamp envelope and in contact with an interior of the lamp envelope. A quantity of sulfur within the interior of the lamp envelope is sufficient to create a sulfur plasma upon excitation. A buffer gas within the interior of the lamp envelope enables initial discharge and heating of the interior of the lamp envelope to excite the sulfur into a plasma state.

In certain embodiments, silicon carbide electrodes are used, which are n-doped. The buffer gas may include at least one of carbon dioxide, oxygen, nitrogen, nitrous oxide, argon, krypton, xenon, or, neon. The lamp envelope extends outwardly from the interior of the lamp envelope at least over a portion of the silicon carbide electrodes. The silicon carbide electrodes may be hermetically sealed with the lamp envelope by a direct sealing of the lamp envelope with the silicon carbide electrodes. Alternatively, the silicon carbide electrodes are hermetically sealed with the lamp envelope by a vacuum-tight epoxy, solder glass, or metallic solder at distances spaced from the interior of the lamp envelope sufficient to avoid damage to the vacuum-tight epoxy, solder glass, or metallic solder from heat from the interior of the lamp envelope. Alternatively, electrical lead feedthroughs in contact with and extending outwardly from the silicon carbide electrodes are hermetically sealed with the lamp envelope. A grading glass or intermediate glass may be positioned between the silicon carbide electrodes and the lamp envelope, the grading glass or intermediate glass providing a seal between the silicon carbide electrodes and the lamp envelope. The silicon carbide electrodes may have an undercut that engages with material of the lamp envelope to create hermetic integrity from the silicon carbide electrode and the material of the lamp envelope pressing against each other upon heating. The silicon carbide electrodes may be angled toward each other at substantially less than 180 degrees. There may be more than two silicon carbide electrodes.

According to another aspect of the invention, a method of manufacturing a sulfur plasma lamp as described above is provided.

According to another aspect of the invention, a plasma lamp includes a lamp envelope of transparent or translucent glass or ceramic material, and at least three electrodes hermetically sealed with the lamp envelope and in contact with an interior of the lamp envelope. A quantity of material within the interior of the lamp envelope is sufficient to create a plasma upon excitation. A buffer gas within the interior of the lamp envelope enables initial discharge and heating of the interior of the lamp envelope to excite the material into a plasma state.

The details of various embodiments of the invention are set forth in the accompanying drawings and the description below. Numerous other features and advantages of the invention will be apparent from the description, the drawings, and the claims.

DESCRIPTION OF THE DRAWINGS

Identical parts are indicated by the same reference numerals. Indices with letters indicate different versions of the same element.

DETAILED DESCRIPTION

Figure 1:
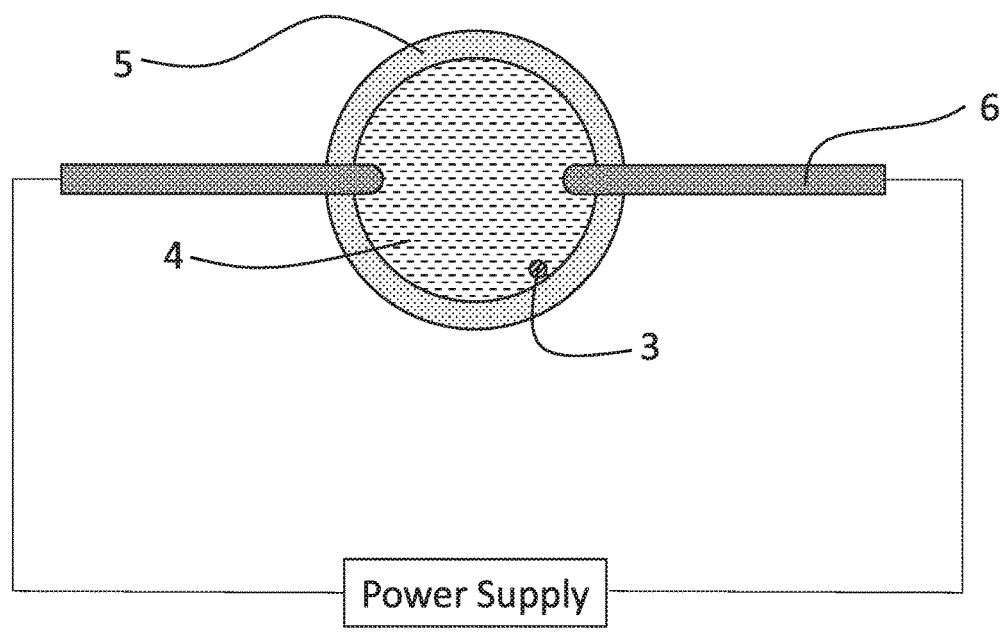
FIG. 1 is a schematic representation of a sulfur plasma lamp with silicon carbide electrodes, together with an inset showing detail of the interface between an electrode and the lamp body.
Figure 7:
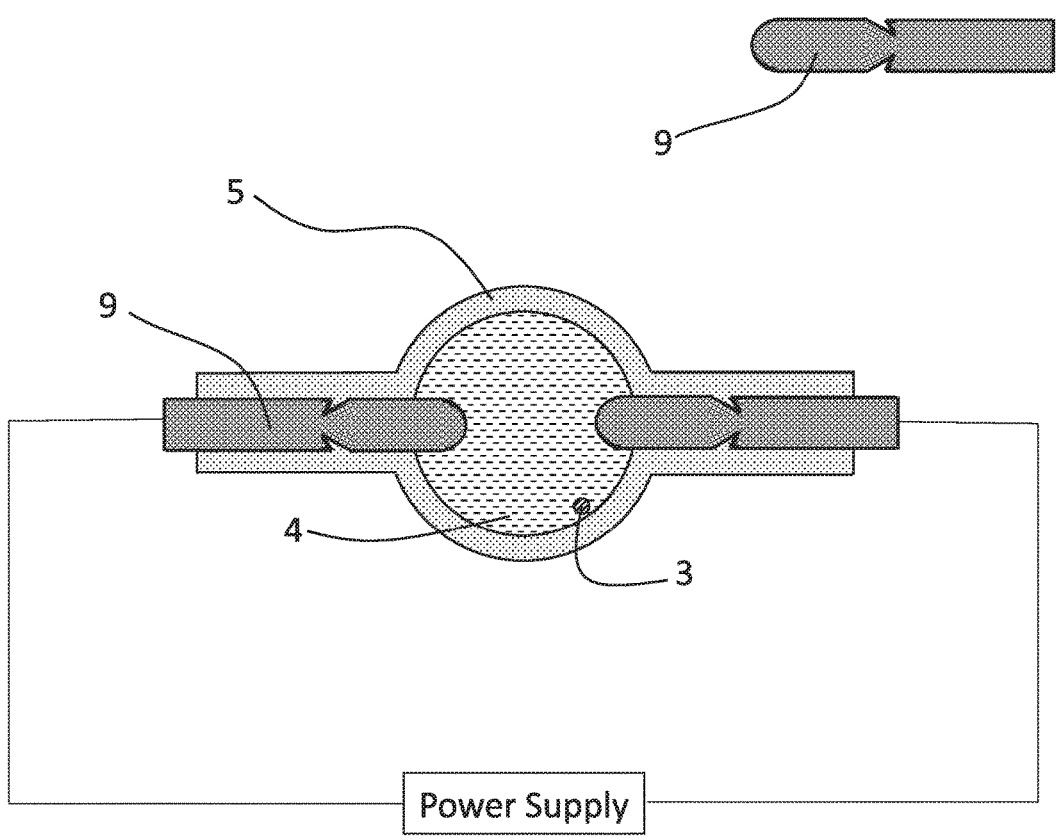
FIG. 7 is a schematic representation of a sulfur plasma lamp in which the electrodes have an inward-projecting feature formed in the body of each electrode.
Figure 8:
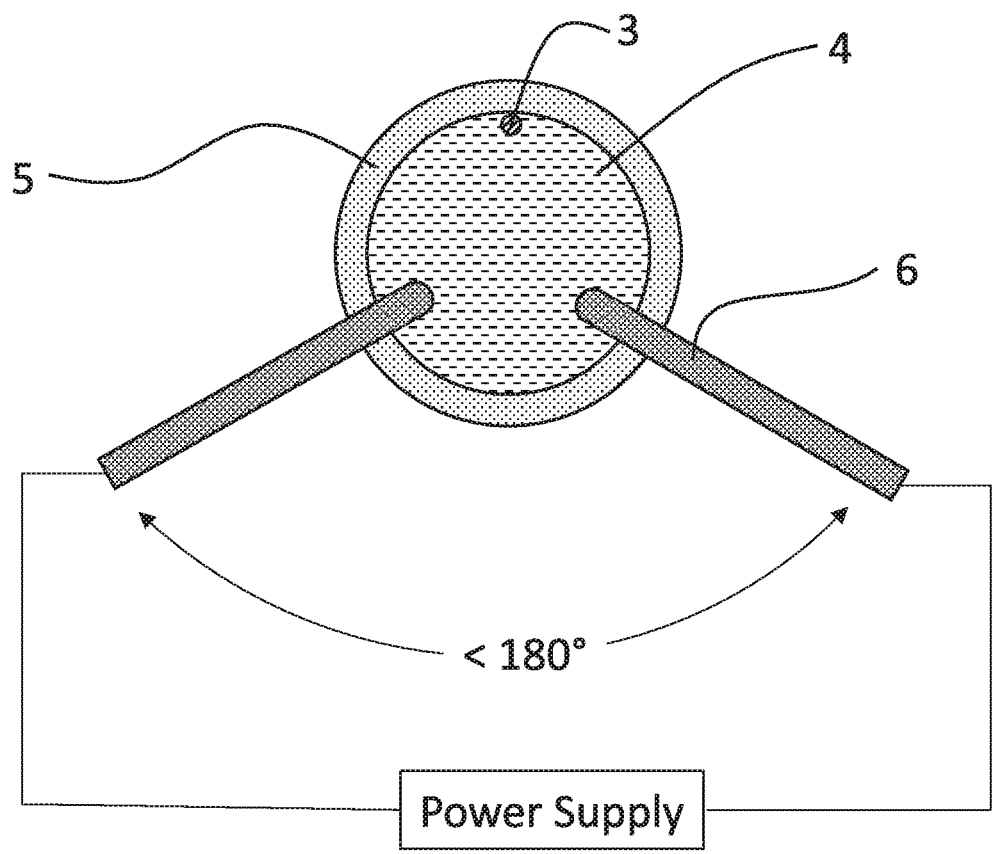
FIG. 8 is a schematic representation of a sulfur plasma lamp in which the electrodes approach each other at an angle substantially less than 180 degrees.
Figure 9:
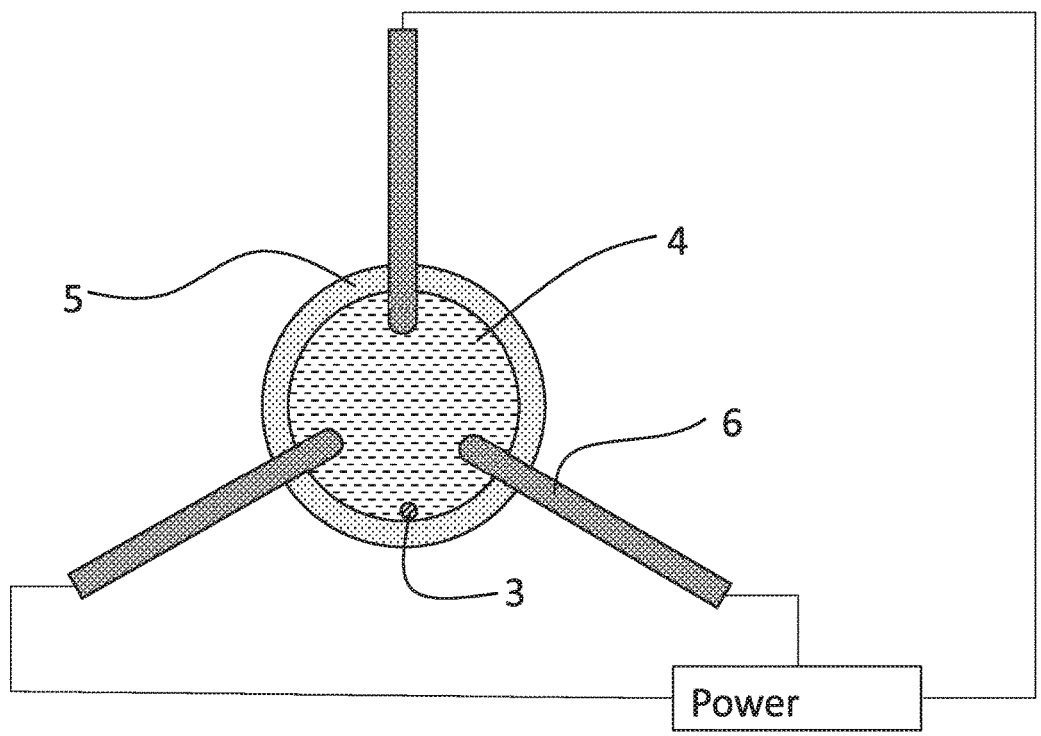
FIG. 9 is a schematic representation of a sulfur plasma lamp having three electrodes.

With reference to FIG. 1, the structure of a sulfur plasma lamp in accordance with the invention includes a transparent or translucent envelope 5 made of glass or ceramic, which has a plurality of electrodes 6 hermetically sealed through the wall of envelope 5 from the outside entering into the free volume within envelope 5. Envelope 5 may be spherical, cylindrical, planar, or any geometry in which there is free volume within. Though not shown in FIG. 1, envelope 5 typically extends outwardly from the interior of the envelope at least over a portion of electrodes 6, as is illustrated in FIGS. 2-7, although the length of such extension of envelope 5 may be only a millimeter or two. The optimal distance between electrodes 6 can be a function of voltage applied to the sulfur plasma lamp, and a function of pressure, since as pressure goes up the voltage requirement may increase, for example. Electrodes 6 may be oriented directly opposed from one another or nearing each other at an angle substantially less than 180 degrees, as is shown in FIG. 8, which may be beneficial to project light as radiant flux onto an area of interest, with most of the radiant flux tending to come out at the bottom of FIG. 8. Certain luminaires, which house the lamp, might work more efficiently if the electrodes approach each other at less than 180 degrees. It is also possible to have three or more electrodes, as is shown in FIG. 9, in order to have a successive excitation discharge, which promotes rotating (stirring) of the sulfur plasma. If more than two electrodes 6 are used, a power supply can fire across different pairs of electrodes at different times, thereby inducing stirring, which can be beneficial for homogeneity of the plasma, and beneficial during a cooling period so that average temperature is reduced to increase lifetime of the lamp. Switching can occur at a rate of at least a couple of dozen hertz, up to the kilohertz or megahertz range.

The envelope material is constructed of any suitable glass or ceramic, and may be amorphous silica, aluminosilicate glass such as the type used in automotive halogen lamps, borosilicate glass such as that used in lab ware, or a translucent or transparent aluminum oxide or zirconium oxide. Glass offers the convenience of being easy to form, easy to process, low cost, and ease of automation of the processes of manipulating the glass to form lamps. Ceramics offer enhanced levels of chemical durability, and permeability to atmospheric gasses so that hydrogen and other gasses do not tend to diffuse into the lamp.

The free volume of envelope 5 may vary from several cubic millimeters to several hundred cubic centimeters, and envelope 5 may be ellipsoidal, spherical, or cylindrical, or may have other geometries. The amount of free volume is limited by how much light is to be produced, because there is a relationship between volume and power of the lamp. Because the sulfur plasma lamp might operate under very high pressure, a more spherical geometry may be desirable because it promotes uniform distribution of mechanical loading and endures high pressures. To obtain a good emission spectrum, it is desirable to operate at high pressures, as much as 10 and even 20 atmospheres, although pressures as low as ½ atmosphere could also be used. Due to the relationship between pressure and dielectric breakdown, greater energy may be required at high pressure.

Within envelope 5 is a small amount of sulfur 3, which is solid at room temperature, prior to lamp ignition. The amount of sulfur contained within lamp envelope 5 may range from fractions of a milligram to several grams depending on the spectral emission output of the lamp desired and its operating temperature and lamp envelope volume. There should be enough sulfur in the lamp that upon heating the desired vapor density is achieved. The fill material within envelope 5 is not limited to just sulfur 3, but may include additional materials such as selenium or bromides, iodides, chlorides or various salts to further modify or shift the emission spectrum or promote a halogen-cycle-like effect that causes vaporized electrode material to be recycled back onto the electrode. Sulfur has a somewhat green hue, and so it may be helpful to add calcium bromide for additional red, or selenium, although selenium can be harmful. Also, bromides, chlorides, or any other metal or semi-metal can introduce an element of toxicity. When sulfur plasma lamps are used primarily for plants, the presence of the green light is not a substantial concern, but if the lamps are used for residential or automotive purposes, the additional components may be desirable. Sulfur plasma provides good performance in that it yields a full spectrum, and in that the electrical characteristics of the lamp, such as voltage and current, remain stable over a long period of time whereas other lamps may tend to get dimmer as their resistance increases. The emission spectrum of the lamp may be tuned by the quantity of sulfur per unit lamp volume, so that the lamp may be operated at a desired vapor concentration, with operating temperature being a factor in the vapor concentration. Denser plasma tends to absorb its own discharge and so affects the spectrum of light that is emitted by the lamp.

The lamp also contains a buffer gas 4 for assisting with the initial discharge of the lamp and initial warming period. Buffer gas 4 is used to start the plasma discharge and then transfer energy to the sulfur, resulting in the sulfur turning into a gas and joining the plasma state. Thus, the warming period is necessary to evaporate cold condensed sulfur 3 into a gaseous state, at which point it is excited by the electrical discharge and enters the plasma state. In other words, it is necessary to use a buffer that is a gas at room temperature so that discharge can start and very quickly heat up and turn the sulfur to liquid and then to gas. The voltage required to initiate discharge can be high. Typically, argon is used at a room-temperature pressure of a few torr to a few hundred torr. A Penning mixture of gas can assist in achieving discharge more easily due to the inclusion of a gas having a relatively low ionization potential, similar to the addition of a small amount of krypton gas to a neon gas lamp. Other gasses may be used, such as any other inert or noble gas, especially krypton, xenon, or neon. Carbon dioxide, oxygen, nitrogen, or nitrous oxide may serve as alternative gasses that help produce a spectrum that is altered in a beneficial manner to be closer to white light due to addition of red light, may assist in the discharge process by making the startup process easier, and may result in increased lamp lifetime. In particular, these alternative gasses may be of assistance to lamp lifetime in that when small amounts of electrode material are being degraded, or broken down, these gases may promote re-condensation of the original electrode material back onto the electrodes rather than on the interior of the lamp envelope, similar to the well-known halogen cycle in tungsten filament halogen lamps. Any combination of all the above-mentioned gasses will also work in a satisfactory manner with pressures as described above. Chemical reactions will occur with the sulfur molecules, but the environment is highly dynamic due to the energy of the system being so high, and so the molecules do not exist for a long time. With cooling, there might be sulfur oxides, hydrogen sulfides, etc.

The methods of sealing n-doped silicon carbide electrodes 6 to the lamp body depend on the lamp envelope material selected for the application, the lamp size, and the operating conditions of the lamp. Hermetic sealing is needed to retain the light-emitting sulfur and buffer gas constituents within lamp envelope 5. The method of sealing providing the best simplicity of pressing of the silicon carbide electrodes to the lamp body is by a simple, direct glass-to-ceramic seal in which a glass with a matched thermal expansion curve to the silicon carbide is used as the material of lamp envelope 5. If an attempt is made to seal materials together having thermal expansion properties that are too far apart, cracking can occur. The silicon carbide is the ceramic of the glass-to-ceramic seal and the lamp envelope is the glass of the glass-to-ceramic seal. The most readily available and easiest source of such glasses are the glasses that are designed to seal to molybdenum, which has a thermal expansion curve similar to silicon carbide, such as, for example, but not limited to, the aluminosilicate glasses used for production of automotive halogen headlamp bulbs. Examples of these glass types include GE180 glass, SCHOTT 8252 and SCHOTT 8253, Corning 1720. Other glass types are adequate for accomplishing this seal such as SCHOTT 8243 and SCHOTT 8250. The matching of glass to the silicon carbide is similar to matching techniques used in connection with other types of electrode materials. Although all of these glasses match silicon carbide in expansion properties, silicon carbide is very inert, and so to get a hermetic seal, the glass has to wet the silicon carbide. The seals can be made by a traditional glassblowing technique. According to a traditional heating and cooling process, the electrode may be in one chuck of a lathe and the glass tube in the other chuck, and then the two chucks are moved toward each other so that sleeving occurs, and then the sleeved connection may be heated with a glass-blowing torch, and a graphite paddle, similar to a spatula, can be used to press the glass down onto the silicon carbide. Alternatively, a small piece of glass around the silicon carbide may be melted to form a bead, and then traditional glass-blowing processes may be used, either executed by humans or by machine. Alternatively, automated pinch seals may be used, in which torches heat a glass tube around a silicon carbide rod, and a tool is used to pinch the tube physically around the rod. The success rate of making the seals is not 100%, however, because there will always be some seals that fail to achieve a hermetic bond/seal. Accordingly, as is shown in FIG. 2, a vacuum-tight epoxy may be used as sealing material 10 applied on the exterior of the ceramic-glass interface to complete in full or to enhance the reliability of the seal.

Figure 2:
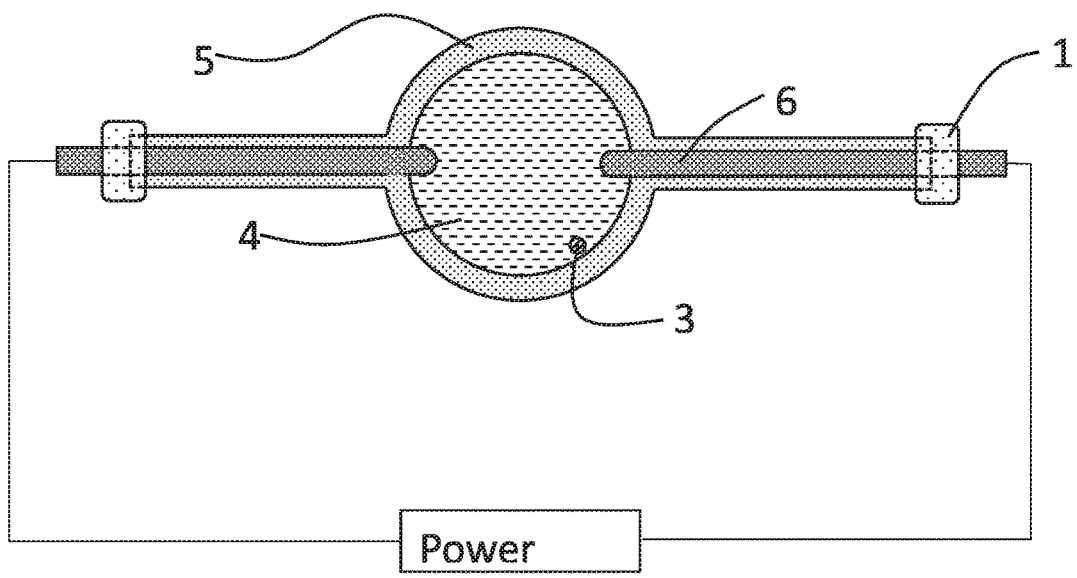
FIG. 2 is a schematic representation of a sulfur plasma lamp in which a vacuum-tight epoxy, solder glass, or metallic solder reinforces the seal between the silicon carbide electrode and the lamp body.

Alternatively, the materials of envelope 5 may also be fused silica, in which case a satisfactory seal is accomplished by use of a solder glass, grading glass, or metallic solder as sealing material 10 shown in FIG. 2. In the instance where lamp envelope 5 is made of a ceramic, a solder glass or metallic solder is used as sealing material 10 to seal the silicon carbide electrodes to aluminum oxide or zirconium oxide lamp envelope 5. Sealing material 10 reinforces the hermetic seal between silicon carbide electrodes 6 and lamp envelope 5 that occurs due to constriction of the material of lamp envelope 5 along the length of electrodes 6 (although the material of lamp envelope and electrodes 6 are not bound together). Sealing material 10 is kept at a distance from the interior of lamp envelope 5 so that sealing material 10 never experiences the high temperatures of the lamp. Solder glasses can achieve very high wetting but can flow at relatively low temperatures. Solder glasses typically are available in a finely ground powder or paste, which can be placed at the desired location and then heated. Grading glasses, however, typically would have to be manipulated through well-known glass-blowing techniques.

To prevent chemical reaction between solder glass 10 and sulfur plasma, very long electrode feedthroughs may be used so that the maximum temperature the solder glass is exposed to is kept to a safe lower limit.

Figure 3:
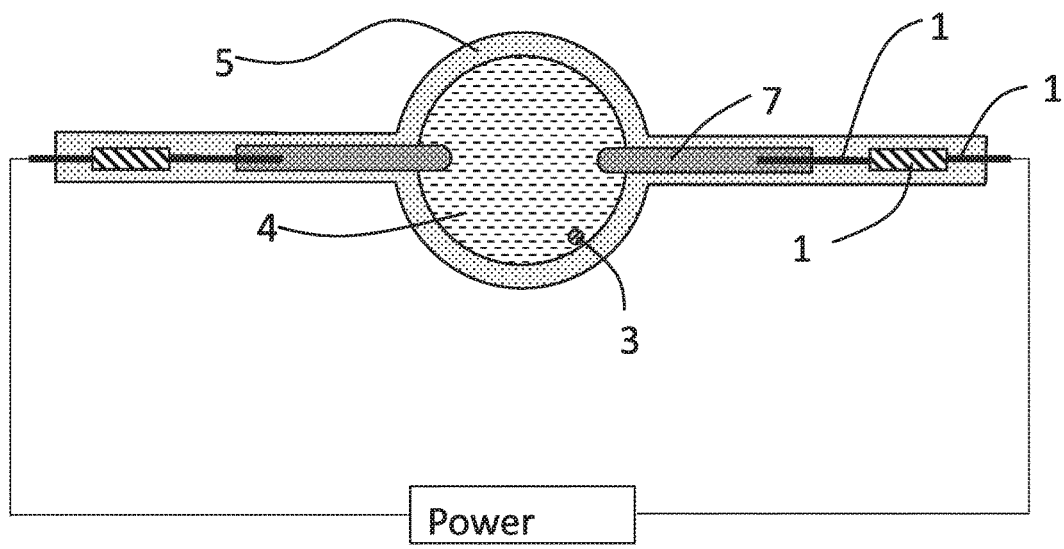
FIG. 3 is a schematic representation of a sulfur plasma lamp in which electrical feedthroughs are bonded to a hermetic molybdenum-to-glass seal.
Figure 4:
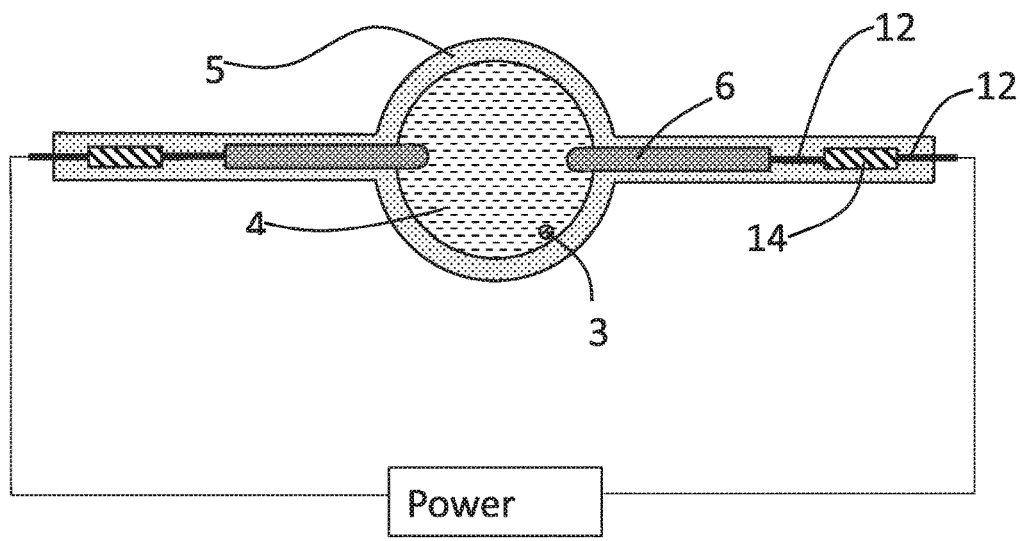
FIG. 4 is a schematic representation of another embodiment of a sulfur plasma lamp in which electrical feedthroughs are bonded to a hermetic molybdenum-to-glass seal.

FIGS. 3 and 4 show examples of such very long electrical lead feedthroughs 12, bonded to a hermetic molybdenum-to-glass seal 14. Molybdenum-to-glass seal 14 is a very thin ribbon, typically a few thousandths of an inch thick, embedded within the glass. Molybdenum ribbon seals are a standard mechanism for achieving a seal, because when there is a mismatch of thermal expansion the molybdenum can yield to the stress and maintain a vacuum-tight seal. Molybdenum-to-glass seal 14 does not just attach to feedthroughs 12 and the glass, but also creates a hermetic seal. Electrical lead feedthroughs 12 may pass into a blind hole bored into a silicon carbide electrode 7 to allow for the mechanical insertion of electrical lead 12 as shown in FIG. 3, in which case electrical leads 12 may simply rest within silicon carbide electrodes 7. Alternatively, electrical leads 12 may be soldered or bonded directly to silicon carbide electrodes 6 as shown in FIG. 4 using a metallic solder, direct welding, or any electrically conductive adhesive or solder, so long as there is enough contact for electricity to pass between electrical leads 12 and electrodes 6. Electrical leads 12 may be made of tungsten, molybdenum, silver, nichrome, platinum, or gold.

Figure 5:
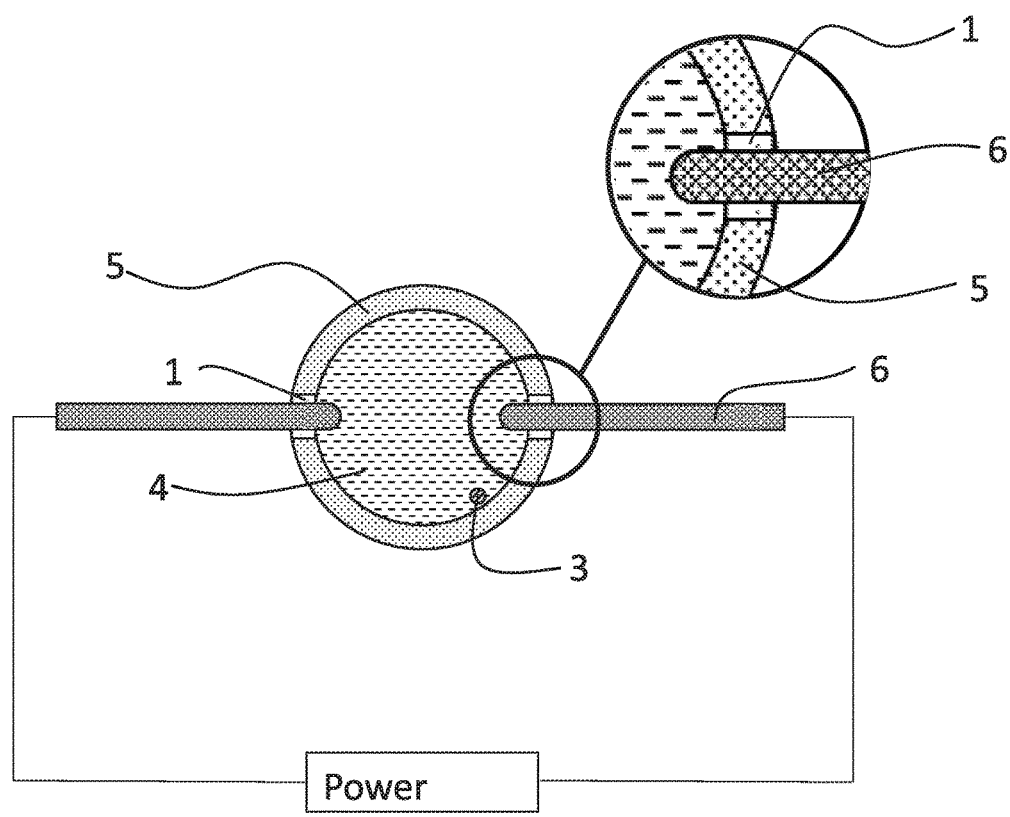
FIG. 5 is a schematic representation of a sulfur plasma lamp in which a grading glass or intermediate glass achieves a hermetic seal between the electrodes and the lamp body.

With reference to FIG. 5, sealing of silicon carbide electrodes 6 to lamp envelope 5 may also be accomplished by using a tungsten sealing glass 11 (such as Corning 3320, which wets with silicon carbide) as an intermediate grading material between the silicon carbide and an aluminosilicate glass or 33 expansion borosilicate glass such as Corning 7740 or SCHOTT 8330. In this instance, envelope 5 is made of either the aluminosilicate glass or the 33 expansion borosilicate glass. However, the operating parameters of the electrode-driven sulfur plasma lamp are limited in the instance where 33 expansion borosilicate glass is used. The temperature of the lamp when using a 33 expansion borosilicate glass envelope is limited as operating temperature approaches the Tg of the 33 expansion borosilicate glass, at which deformation or ballooning can occur due to softening of the glass. Grading glass or intermediate glass 11 is used to achieve a hermetic and mechanically robust seal between electrodes 6 and lamp envelop 5. Ideally, intermediate glass 11 is a glass that wets silicon carbide electrode 6 easily and also wets the material of lamp envelope 5. In other words, intermediate glass 11 achieves good interfacial adherence to silicon carbide electrodes 6 and to lamp envelope 5 at the hot temperatures at which sealing occurs due to the ability of glass to flow at such temperatures. The technique of FIG. 5 is advantageous if there is a substantial mismatch between the material of lamp envelope 5 and silicon carbide electrodes 6. Grading glass 11 might be suitable for wetting and sealing the silicon carbide, but, for example, might not be transparent or might not have the right mechanical strength to serve as lamp envelope 5. In certain embodiments, there might be more than one intermediate glass to progressively achieve matching if there is a difference in thermal expansion characteristics between the lamp envelope and the electrodes.

Figure 6:
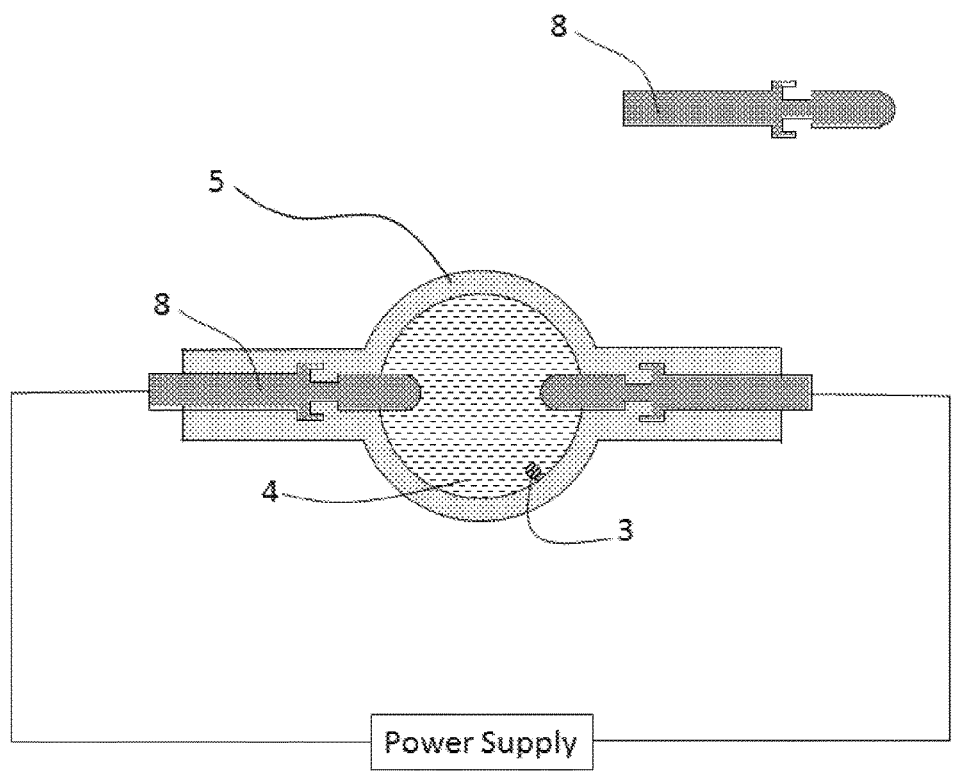
FIG. 6 is a schematic representation of a sulfur plasma lamp in which the electrodes have an inverted geometry, or undercut, formed in the body of each electrode.

With reference to FIG. 6, a satisfactory seal between silicon carbide electrodes 8 and glass envelope 5 is achievable by producing an undercut in the silicon carbide electrodes so that the electrodes have an inverted geometry formed in the body of the electrodes, and allowing the undercut to be filled with the glass in order to promote a more mechanically robust hermetic seal between silicon carbide electrode 8 and glass envelope 5. Because of thermal expansion differences, the silicon carbide will expand more upon heating and clamp down on or constrict the glass, or the glass will expand more and clamp down on or constrict the silicon carbide. Increased hermetic integrity results from the glass and silicon carbide pressing against each other upon heating and cooling, ensuring that a strong bond is achieved. In order for this seal to work properly, thermal expansion differences of the lamp material with respect to the silicon carbide electrodes must be carefully chosen. This mechanical hermetic seal may be the sole sealing mechanism, or hermetic sealing can also form due to bonding of the glass to silicon carbide at hot temperatures, with the mechanical hermetic sealing serving as an assist. FIG. 7 illustrates a similar embodiment in which silicon carbide electrodes 9 have an undercut forming an inward projecting feature that achieves the same effect as electrodes 8 in FIG. 6.

Another last method used to seal the silicon carbide to the ceramic envelope is by using a spark plasma sintering apparatus to force a hermetic seal between the silicon carbide and the aluminum oxide. This technique is similar to the pinch seal technique described above, except that it is performed under very high pressure and temperature. Aluminum oxide is a ceramic and may creep at high temperature, and so welding occurs under constant high pressure and high temperature with the aluminum oxide being under a static load. An aluminum oxide tube may be provided, very near its final shape, and a rod may be inserted inside the aluminum oxide tube, and then the pressure and temperature causes the bonding.

Operation of the lamp is accomplished at an electrical potential of at least 80 volts with a frequency of at least 50 hertz, although it is possible a direct current could be used. Alternatively, higher frequencies on the order of kilohertz, or even as much as a megahertz, offer greater efficiency in terms of light output per energy input to the system due to the higher frequency excitation energy approaching the natural rate the excited luminous states depopulate. e.g. less light emitting transitions remain depopulated per unit time at higher excitation frequencies. Voltage needed to drive the sulfur plasma lamp with the silicon carbide electrodes depends largely on fill pressure within the envelope and the distance between the electrodes.

The silicon carbide believed to exhibit the best performance as the electrode material is an n-doped silicon carbide. N-doped silicon carbide electrodes are able to drive the sulfur plasma directly and reliably. It is possible that p-doping will also be effective, or that silicon carbide can be used without doping. Because silicon carbide is very chemically stable, exhibiting essentially no reaction with sulfur except at extremely high temperatures, any reaction with the sulfur plasma will be very slow.

There has been described a system and method for a plasma lamp and its manufacture and use. While several particular forms of the invention have been illustrated and described, it will be apparent that various modifications and combinations of the invention detailed in the text and drawings can be made without departing from the spirit and scope of the invention. Accordingly, it is not intended that the invention be limited, except as by the appended claims.

What is claimed is:

1. A sulfur plasma lamp, comprising:
   a lamp envelope of transparent or translucent glass or ceramic material;
   at least two non-oxide ceramic electrodes hermetically sealed with the lamp envelope and in contact with an interior of the lamp envelope;
   a quantity of sulfur within the interior of the lamp envelope sufficient to create a sulfur plasma upon excitation; and
   a buffer gas within the interior of the lamp envelope for enabling initial discharge and heating of the interior of the lamp envelope to excite the sulfur into a plasma state.

2. A sulfur plasma lamp in accordance with claim 1 wherein the non-oxide ceramic electrodes are silicon carbide electrodes.

3. A sulfur plasma lamp in accordance with claim 2, wherein the silicon carbide electrodes are doped.

4. A sulfur plasma lamp in accordance with claim 1, wherein the buffer gas comprises at least one of carbon dioxide, oxygen, nitrogen, or nitrous oxide.

5. A sulfur plasma lamp in accordance with claim 1, wherein the buffer gas comprises at least one of argon, krypton, xenon, or neon.

6. A sulfur plasma lamp in accordance with claim 1, wherein the interior of the lamp further comprises at least one of selenium, a bromide, an iodide, a chloride, or a salt, having an effect of promoting recycling of electrode material back onto the electrodes.

7. A sulfur plasma lamp in accordance with claim 1, wherein the lamp envelope extends outwardly from the interior of the lamp envelope at least over a portion of the silicon carbide electrodes.

8. A sulfur plasma lamp in accordance with claim 1, wherein the silicon carbide electrodes are hermetically sealed with the lamp envelope by a direct sealing of the lamp envelope with the silicon carbide electrodes.

9. A sulfur plasma lamp in accordance with claim 1, wherein the silicon carbide electrodes are hermetically sealed with the lamp envelope by a vacuum-tight epoxy, solder glass, or metallic solder at distances spaced from the interior of the lamp envelope sufficient to avoid damage to the vacuum-tight epoxy, solder glass, or metallic solder from heat from the interior of the lamp envelope.

10. A sulfur plasma lamp in accordance with claim 1, further comprising electrical lead feedthroughs in contact with and extending outwardly from the silicon carbide electrodes, the electrical lead feedthroughs being hermetically sealed with the lamp envelope.

11. A sulfur plasma lamp in accordance with claim 1, further comprising a grading glass or intermediate glass provided between the silicon carbide electrodes and the lamp envelope, the grading glass or intermediate glass providing a seal between the silicon carbide electrodes and the lamp envelope.

12. A sulfur plasma lamp in accordance with claim 1, wherein the silicon carbide electrodes have an undercut that engages with material of the lamp envelope to create hermetic integrity from the silicon carbide electrode and the material of the lamp envelope pressing against each other upon heating.

13. A sulfur plasma lamp in accordance with claim 1, wherein the silicon carbide electrodes near each other at an angle substantially less than 180 degrees.

14. A sulfur plasma lamp in accordance with claim 1, comprising more than two silicon carbide electrodes.

15. A method of manufacturing a sulfur plasma lamp, comprising:
    providing at least two non-oxide ceramic electrodes;
    forming a lamp envelope of transparent or translucent glass or ceramic material;
    hermetically sealing the silicon carbide electrodes with the lamp envelope and in contact with an interior of the lamp envelope;
    providing a quantity of sulfur within the interior of the lamp envelope sufficient to create a sulfur plasma upon excitation; and
    providing a buffer gas within the interior of the lamp envelope for enabling initial discharge and heating of the interior of the lamp envelope to excite the sulfur into a plasma state.

16. A method in accordance with claim 15 wherein the non-oxide ceramic electrodes are silicon carbide electrodes.

17. A method in accordance with claim 15 wherein the step of hermetically sealing the silicon carbide electrodes with the lamp envelope comprises directly sealing the lamp envelope with the silicon carbide electrodes.

18. A method in accordance with claim 15 wherein the step of hermetically sealing the silicon carbide electrodes with the lamp envelope comprises hermetically sealing the silicon carbide electrodes with the lamp envelope by a vacuum-tight epoxy, solder glass, or metallic solder at distances spaced from the interior of the lamp envelope sufficient to avoid damage to the vacuum-tight epoxy, solder glass, or metallic solder from heat from the interior of the lamp envelope.

19. A method in accordance with claim 15 further comprising providing electrical lead feedthroughs in contact with and extending outwardly from the silicon carbide electrodes, and hermetically sealing the electrical lead feedthroughs with the lamp envelope.

* * * * *